United States Patent
Baba et al.

(10) Patent No.: US 11,433,887 B2
(45) Date of Patent: Sep. 6, 2022

(54) UNMANNED VEHICLE CONTROL SYSTEM, UNMANNED VEHICLE, AND UNMANNED VEHICLE CONTROL METHOD

(71) Applicant: Komatsu Ltd., Tokyo (JP)

(72) Inventors: Akinori Baba, Tokyo (JP); Ryuu Yamamura, Tokyo (JP)

(73) Assignee: Komatsu Ltd., Tokyo (JP)

( * ) Notice: Subject to any disclaimer, the term of this patent is extended or adjusted under 35 U.S.C. 154(b) by 9 days.

(21) Appl. No.: 16/980,532

(22) PCT Filed: Feb. 20, 2019

(86) PCT No.: PCT/JP2019/006362
§ 371 (c)(1),
(2) Date: Sep. 14, 2020

(87) PCT Pub. No.: WO2020/026485
PCT Pub. Date: Feb. 6, 2020

(65) Prior Publication Data
US 2021/0001847 A1 Jan. 7, 2021

(30) Foreign Application Priority Data
Jul. 31, 2018 (JP) .............................. JP2018-144450

(51) Int. Cl.
*G05D 1/00* (2006.01)
*B60W 30/14* (2006.01)
(Continued)

(52) U.S. Cl.
CPC ........ *B60W 30/146* (2013.01); *B60W 60/001* (2020.02); *G05D 1/028* (2013.01);
(Continued)

(58) Field of Classification Search
CPC .................. B60W 30/146; B60W 60/001; G05D 1/0223; G05D 1/028; G05D 2201/0202;
(Continued)

(56) References Cited

U.S. PATENT DOCUMENTS

| | | | |
|---|---|---|---|
| 9,487,931 B2 * | 11/2016 | Atkinson | ............... E02F 9/2045 |
| 10,031,528 B2 * | 7/2018 | Sakai | ................... G05D 1/0274 |

(Continued)

FOREIGN PATENT DOCUMENTS

| | | |
|---|---|---|
| JP | 2000-284830 A | 10/2000 |
| JP | 2011-152908 A | 8/2011 |

(Continued)

OTHER PUBLICATIONS

International Search Report dated May 21, 2019, issued for PCT/JP2019/006362.

(Continued)

*Primary Examiner* — Masud Ahmed
(74) *Attorney, Agent, or Firm* — Locke Lord LLP

(57) ABSTRACT

An unmanned vehicle control system includes: a specified command value calculation unit that calculates a specified command value for start of an unmanned vehicle; a corrected command value calculation unit that, when request data requesting a limitation of a travel speed of the unmanned vehicle is acquired, corrects the specified command value based on the request data to calculate a corrected command value; and a travel control unit that, when the request data is acquired, controls the start of the unmanned vehicle based on the corrected command value.

4 Claims, 6 Drawing Sheets

(51) Int. Cl.
*B60W 60/00* (2020.01)
*G05D 1/02* (2020.01)
*G08G 1/052* (2006.01)

(52) U.S. Cl.
CPC ............ *G05D 1/0223* (2013.01); *G08G 1/052* (2013.01); *G05D 2201/0202* (2013.01)

(58) Field of Classification Search
CPC ............. G08G 1/052; G08G 1/096775; G08G 1/096725
See application file for complete search history.

(56) References Cited

U.S. PATENT DOCUMENTS

| | | | | |
|---|---|---|---|---|
| 10,777,027 | B2* | 9/2020 | Oda | ........................ H04L 67/12 |
| 2013/0238182 | A1 | 9/2013 | Osagawa et al. | |
| 2017/0151946 | A1 | 6/2017 | Shiga et al. | |
| 2017/0174123 | A1* | 6/2017 | Ogihara | ............... G05D 1/0217 |
| 2017/0278395 | A1* | 9/2017 | Hamada | ................. G08G 1/207 |
| 2018/0073208 | A1* | 3/2018 | Wilson | ..................... G01C 7/04 |
| 2018/0182248 | A1* | 6/2018 | Kanai | .............. G08G 1/096855 |
| 2019/0244524 | A1* | 8/2019 | Tanaka | ................. G05D 1/0214 |

FOREIGN PATENT DOCUMENTS

| | | |
|---|---|---|
| JP | 2012-214122 A | 11/2012 |
| WO | 2016/080555 A1 | 5/2016 |

OTHER PUBLICATIONS

Office Action dated Aug. 13, 2021, issued in the corresponding Australian patent application No. 2019315065.

* cited by examiner ated and a plurality of hydraulic cylinders (not illustrated) that operating with hydraulic oil discharged from the hydraulic pump.

UNMANNED VEHICLE CONTROL SYSTEM, UNMANNED VEHICLE, AND UNMANNED VEHICLE CONTROL METHOD

FIELD

The present invention relates to an unmanned vehicle control system, an unmanned vehicle, and an unmanned vehicle control method.

BACKGROUND

In a work site in a wide area such as a mine, an unmanned vehicle that travels in an unmanned state is sometimes used.

CITATION LIST

Patent Literature

Patent Literature 1: International Publication No. 2016/080555

SUMMARY

Technical Problem

An unmanned vehicle travels on a work site based on travel condition data transmitted from a control facility. The travel condition data includes a target travel speed and a target travel course of the unmanned vehicle. For example, when the target travel speed of the unmanned vehicle immediately after start is limited to a low speed, the unmanned vehicle fails to follow the target travel speed, and an actual travel speed of the unmanned vehicle is likely to overshoot the target travel speed. As a result, the unmanned vehicle is likely to deviate from the target travel course. If the unmanned vehicle deviates from the target travel course and the operation of the unmanned vehicle is stopped, the productivity at the work site is likely to decrease.

An aspect of the present invention aims to suppress a decrease in productivity at a work site where an unmanned vehicle operates.

Solution to Problem

According to an aspect of the present invention, an unmanned vehicle control system comprises: a specified command value calculation unit that calculates a specified command value for start of an unmanned vehicle; a corrected command value calculation unit that, when request data requesting a limitation of a travel speed of the unmanned vehicle is acquired, corrects the specified command value based on the request data to calculate a corrected command value; and a travel control unit that, when the request data is acquired, controls the start of the unmanned vehicle based on the corrected command value.

Advantageous Effects of Invention

According to the aspect of the present invention, it is possible to suppress the decrease in productivity at the work site where the unmanned vehicle operates.

DESCRIPTION OF EMBODIMENTS

Hereinafter, embodiments of the present invention will be described with reference to the drawings, but the present invention is not limited thereto. Components of the embodiments to be described below can be combined as appropriate. In addition, there is also a case where some components are not used.

[Management System]

Figure 1:
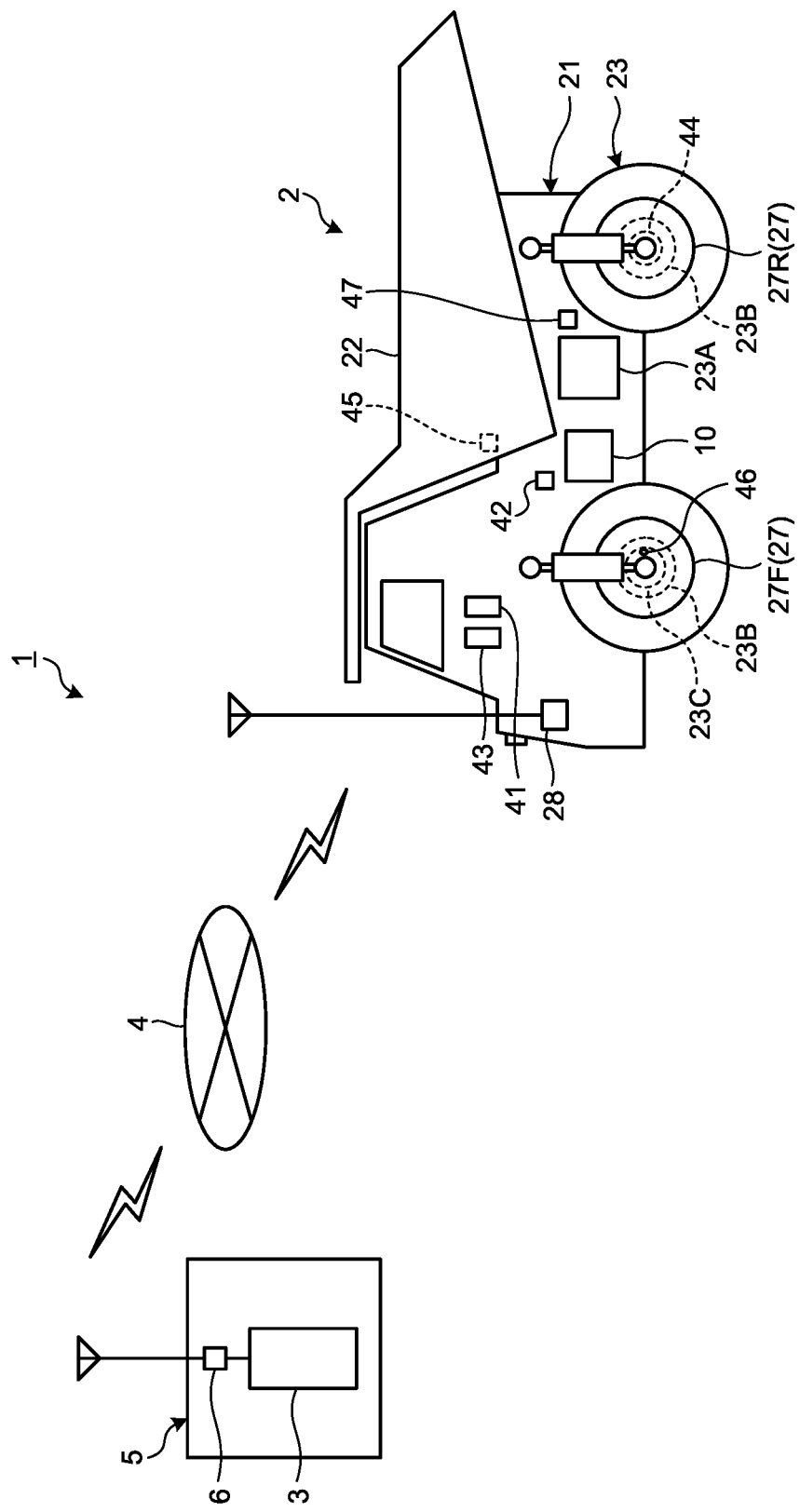
FIG. 1 is a view schematically illustrating examples of a management system and an unmanned vehicle according to an embodiment.

FIG. 1 is a view schematically illustrating examples of a management system 1 and an unmanned vehicle 2 according to the present embodiment. The unmanned vehicle 2 refers to a work vehicle that travels in an unmanned state based on a control command without depending on a driving operation performed by a driver.

The unmanned vehicle 2 operates at a work site. In the present embodiment, the work site is a mine or a quarry. The unmanned vehicle 2 is a dump truck that travels at the work site and transports a cargo. The mine refers to a place or a business site where a mineral is mined. The quarry refers to a place or a business site where a rock is mined. As the cargo transported to the unmanned vehicle 2, ore or dirt excavated in the mine or the quarry is exemplified.

The management system 1 includes a management device 3 and a communication system 4. The management device 3 includes a computer system and is installed in a control facility 5 at the work site. A controller exists in the control facility 5. The communication system 4 performs communication between the management device 3 and the unmanned vehicle 2. The management device 3 is connected with a wireless communication device 6. The communication system 4 includes the wireless communication device 6. The management device 3 and the unmanned vehicle 2 wirelessly communicate with each other via the communication system 4. The unmanned vehicle 2 travels on a travel path HL at the work site based on travel condition data transmitted from the management device 3.

[Unmanned Vehicle]

The unmanned vehicle 2 includes a vehicle main body 21, a dump body 22 supported by the vehicle main body 21, a traveling device 23 that supports the vehicle main body 21, a position sensor 41, an inclination sensor 42, an azimuth sensor 43, a speed sensor 44, a dump body sensor 45, an oil pressure sensor 46, an oil temperature sensor 47, a wireless communication device 28, and a control device 10.

The vehicle main body 21 includes a vehicle body frame and supports the dump body 22. In addition, the vehicle main body 21 also includes a hydraulic pump (not illustrated) and a plurality of hydraulic cylinders (not illustrated) that operating with hydraulic oil discharged from the hydraulic pump.

The dump body 22 is a member on which a cargo is loaded. The dump body 22 is raised and lowered by the operation of a hoist cylinder which is the hydraulic cylinder. The dump body 22 is adjusted to at least one of a loading posture and a dumping posture by the operation of the hoist cylinder. The loading posture is a posture that enables loading of the cargo, and is a posture where the dump body 22 is lowered. The dumping posture is a posture for discharging the cargo, and is a posture where the dump body 22 is raised.

The traveling device 23 includes wheels 27 and travels on the travel path HL. The wheels 27 include front wheels 27F and rear wheels 27R. Tires are mounted on the wheels 27. The traveling device 23 has a drive device 23A, a brake device 23B, and a steering device 23C.

The drive device 23A generates a driving force for accelerating the unmanned vehicle 2. The drive device 23A includes an internal combustion engine such as a diesel engine. Note that the drive device 23A may include an electric motor. The driving force generated by the drive device 23A is transmitted to the rear wheel 27R so that the rear wheels 27R rotate. The unmanned vehicle 2 travels autonomously as the rear wheels 27R rotate.

The brake device 23B generates a braking force for decelerating or stopping the unmanned vehicle 2.

The steering device 23C can adjust a traveling direction of the unmanned vehicle 2. The traveling direction of the unmanned vehicle 2 includes an azimuth of the front part of the vehicle main body 21. The steering device 23C adjusts the traveling direction of the unmanned vehicle 2 by steering the front wheels 27F. The steering device 23C has a steering cylinder that is the hydraulic cylinder. The front wheels 27F are steered by the power generated by a steering cylinder.

The position sensor 41 detects a position of the unmanned vehicle 2 traveling on the travel path HL. Detection data of the position sensor 41 includes absolute position data indicating an absolute position of the unmanned vehicle 2. The absolute position of the unmanned vehicle 2 is detected using a global navigation satellite system (GNSS). The global navigation satellite system includes a global positioning system (GNSS). The position sensor 41 includes a GNSS receiver. The global navigation satellite system detects the absolute position of the unmanned vehicle 2 specified by coordinate data of the longitude, latitude, and altitude. The absolute position of the unmanned vehicle 2 specified in a global coordinate system is detected by the global navigation satellite system. The global coordinate system is a coordinate system fixed to the earth.

The inclination sensor 42 detects an inclination angle of the unmanned vehicle 2 traveling on the travel path HL. The inclination angle of the unmanned vehicle 2 includes a roll angle and a pitch angle. The roll angle refers to an inclination angle of the unmanned vehicle 2 about a rotation axis extending in the front-rear direction of the unmanned vehicle 2. The pitch angle refers to an inclination angle of working equipment about a rotation axis extending in the left-right direction of the unmanned vehicle 2. Detection data of the inclination sensor 42 includes inclination angle data indicating the inclination angle of the unmanned vehicle 2. The inclination sensor 42 includes, for example, an inertial measurement unit (IMU).

The azimuth sensor 43 detects an azimuth of the unmanned vehicle 2. The azimuth of the unmanned vehicle 2 includes a yaw angle of the unmanned vehicle 2. The yaw angle refers to an inclination angle of the unmanned vehicle 2 about a rotation axis extending in the up-down direction of the unmanned vehicle 2. Detection data of the azimuth sensor 43 includes azimuth data indicating the azimuth of the unmanned vehicle 2. The azimuth of the unmanned vehicle 2 is a traveling direction of the unmanned vehicle 2. The azimuth sensor 43 includes a gyro sensor, for example. The yaw angle of the unmanned vehicle 2 may be detected by the inclination sensor 42.

The speed sensor 44 detects a travel speed of the unmanned vehicle 2. Detection data of the speed sensor 44 includes travel speed data indicating the travel speed of the traveling device 23.

The dump body sensor 45 detects a position of the dump body 22 that is raised and lowered. The dump body sensor 45 detects whether the dump body 22 is in the loading posture or the dumping posture. Detection data of the dump body sensor 45 includes dump body data indicating the posture of the dump body 22.

The oil pressure sensor 46 detects an oil pressure of the steering cylinder of the steering device 23C. The steering cylinder, which is the hydraulic cylinder, operates as hydraulic oil is supplied. The oil pressure sensor 46 detects the pressure of the hydraulic oil in the steering cylinder. Detection data of the oil pressure sensor 46 includes oil pressure data indicating the pressure of hydraulic oil.

The oil temperature sensor 47 detects a temperature of hydraulic oil discharged from the hydraulic pump. Detection data of the oil temperature sensor 47 includes oil temperature data indicating the temperature of hydraulic oil.

The wireless communication device 28 wirelessly communicates with the wireless communication device 6 connected to the management device 3. The communication system 4 includes the wireless communication device 28.

The control device 10 includes a computer system and is arranged in the vehicle main body 21. The control device 10 outputs control commands to control traveling of the traveling device 23 of the unmanned vehicle 2. The control commands output from the control device 10 include an accelerator command to operate the drive device 23A, a brake command to operate the brake device 23B and a steering command to operate the steering device 23C. The drive device 23A generates a driving force for accelerating the unmanned vehicle 2 based on the accelerator command output from the control device 10. The brake device 23B generates a braking force for decelerating or stopping the unmanned vehicle 2 based on the brake command output from the control device 10. The steering device 23C generates a swinging force for changing a direction of the front wheels 27F so as to make the unmanned vehicle 2 travel straight or swing based on the steering command output from the control device 10.

[Travel Path]

Figure 2:
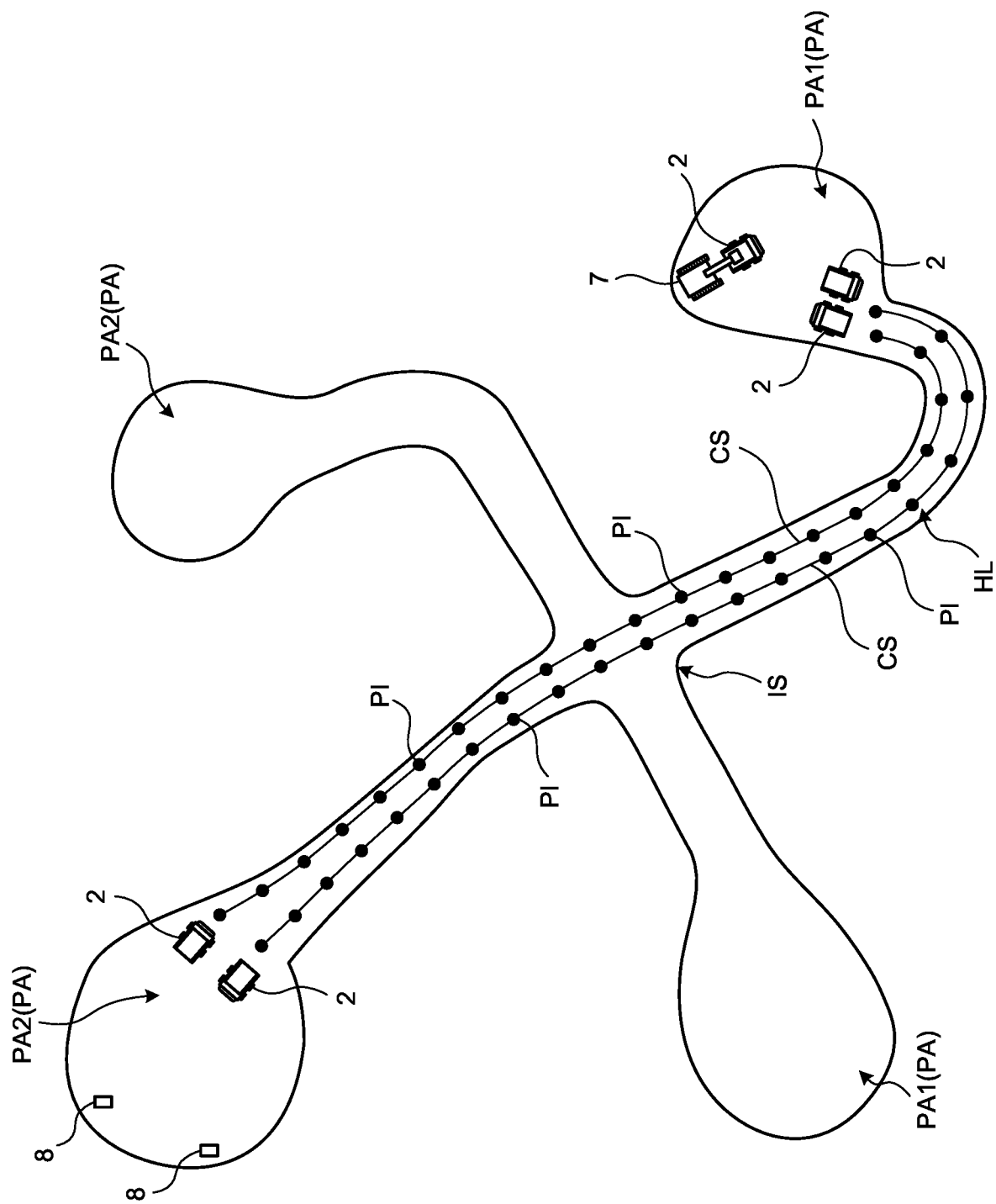
FIG. 2 is a view schematically illustrating the unmanned vehicle and a travel path according to the embodiment.

FIG. 2 is a view schematically illustrating the unmanned vehicle 2 and the travel path HL according to the present embodiment. The travel path HL leads to a plurality of work sites PA in the mine. The work sites PA include at least one of a loading site PA1 and a discharging site PA2. An intersection IS is provided on the travel path HL.

The loading site PA1 refers to an area where loading work for loading the cargo on the unmanned vehicle 2 is performed. At the loading site PA1, a loader 7 such as a hydraulic excavator operates. The discharging site PA2 refers to an area where discharging work for discharging the cargo from the unmanned vehicle 2 is performed. For example, a crusher 8 is provided at the discharging site PA2.

The management device 3 sets a travel condition of the unmanned vehicle 2 on the travel path HL. The unmanned vehicle 2 travels on the travel path HL based on travel condition data that specifies the travel condition transmitted from the management device 3.

The travel condition data that specifies the travel condition of the unmanned vehicle 2 includes target position x and y, a target travel speed Vr, a target azimuth θr, and a target travel course CS of the unmanned vehicle 2.

As illustrated in FIG. 2, the travel condition data includes a plurality of travel points PI set on the travel path HL at intervals. The interval between the travel points PI is set between, for example, 1 [m] and 5 [m]. The travel point PI specifies the target positions x and y of the unmanned vehicle 2.

The target travel speed Vr and the target azimuth θr are set for each of the plurality of travel points PI.

The target travel course CS is specified by a line connecting the plurality of travel points PI.

That is, the travel condition data that specifies the travel condition of the unmanned vehicle 2 includes the plurality of travel points PI indicating the target positions x and y of the unmanned vehicle 2, and the target travel speed Vr and the target azimuth θr of the unmanned vehicle 2 set at each of the plurality of travel points PI.

The target positions x and y of the unmanned vehicle 2 refers to target positions of the unmanned vehicle 2 specified in the global coordinate system. That is, the target positions x and y refer to the target positions in the coordinate data specified by the longitude, latitude and altitude. The target position x refers to a target position in longitude (x-coordinate). The target position y refers to a target position in latitude (y-coordinate). Note that the target positions x and y of the unmanned vehicle 2 may be specified in a local coordinate system of the unmanned vehicle 2.

The target travel speed Vr of the unmanned vehicle 2 refers to a target travel speed of the unmanned vehicle 2 at the time of traveling at (passing through) the travel point PI. When the target travel speed Vr at a first travel point PI1 is set to a first target travel speed Vr1, the drive device 23A or the brake device 23B of the unmanned vehicle 2 is controlled such that an actual travel speed Vs of the unmanned vehicle 2 at the time of traveling on the first travel point PI1 is the first target travel speed Vr1. When the target travel speed Vr at a second travel point PI2 is set to a second target travel speed Vr2, the drive device 23A or the brake device 23B of the unmanned vehicle 2 is controlled such that an actual travel speed Vs of the unmanned vehicle 2 at the time of traveling on the second travel point PI2 is the second target travel speed Vr2.

The target azimuth θr of the unmanned vehicle 2 refers to a target azimuth of the unmanned vehicle 2 at the time of traveling at (passing through) the travel point PI. In addition, the target azimuth θr refers to an azimuth angle of the unmanned vehicle 2 with respect to the reference azimuth (for example, north). In other words, the target azimuth θr is a target azimuth of the front part of the vehicle main body 21, and indicates a target traveling direction of the unmanned vehicle 2. When the target azimuth θr at the first travel point PI1 is set to a first target azimuth θr1, the steering device 23C of the unmanned vehicle 2 is controlled such that the actual azimuth θs of the unmanned vehicle 2 at the time of traveling on the first travel point PI1 is the first target azimuth θr1. When the target azimuth θr at the second travel point PI2 is set to a second target azimuth θr2, the steering device 23C of the unmanned vehicle 2 is controlled such that the actual azimuth θs of the unmanned vehicle 2 at the time of traveling on the second travel point PI2 is the second target azimuth θr2.

[Control System]

Figure 3:
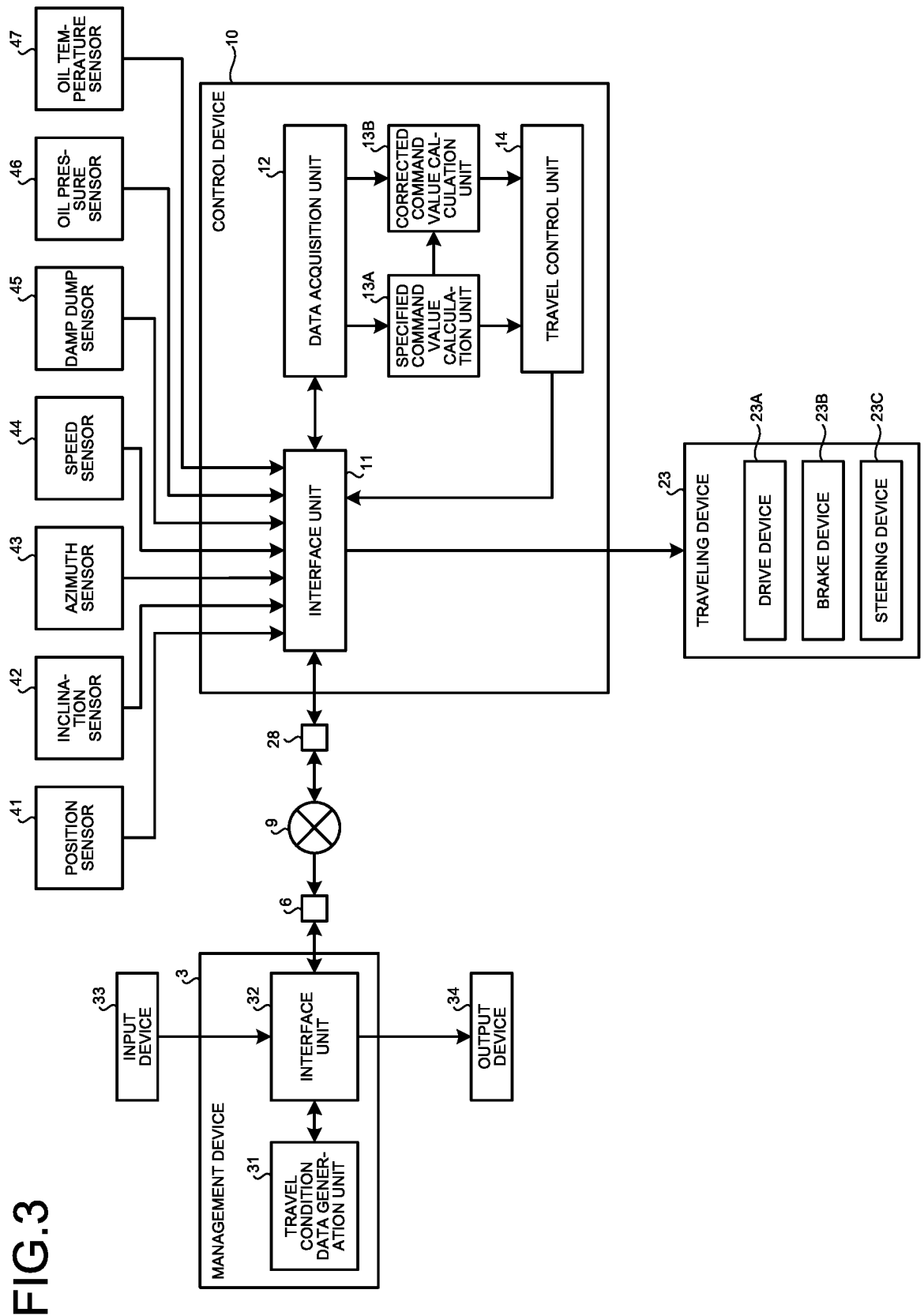
FIG. 3 is a functional block diagram illustrating an unmanned vehicle control system according to the embodiment.

FIG. 3 is a functional block diagram illustrating a control system of the unmanned vehicle 2 according to the present embodiment. The control system includes the management device 3 and the control device 10. The control device 10 can communicate with the management device 3 via the communication system 4.

The management device 3 includes a travel condition data generation unit 31 and an interface unit 32. The travel condition data generation unit 31 generates travel condition data that specifies a travel condition of the unmanned vehicle 2. The interface unit 32 is connected to each of an input device 33, an output device 34, and the wireless communication device 6. The input device 33, the output device 34, and the wireless communication device 6 are installed in the control facility 5. The travel condition data generation unit 31 communicates with each of the input device 33, the output device 34, and the wireless communication device 6 via the interface unit 32.

The input device 33 is operated by the controller of the control facility 5 to generate input data. The input data generated by the input device 33 is output to the management device 3. The management device 3 acquires the input data from the input device 33. As the input device 33, a contact-type input device that is operated by the controller's hand, such as a computer keyboard, a mouse, a touch panel, an operation switch, and an operation button, is exemplified. Note that the input device 33 may be a voice input device operated by the controller's voice.

The output device 34 provides output data to the controller of the control facility 5. The output device 34 may be a display device that outputs display data, a printing device that outputs print data, or a voice output device that outputs voice data. As the display device, a flat panel display, such as a liquid crystal display (LCD) and an organic electroluminescence display (OELD), is exemplified.

The travel condition is determined by, for example, the controller existing in the control facility 5. The controller operates the input device 33 connected to the management device 3. The travel condition data generation unit 31 generates the travel condition data based on the input data generated by operating the input device 33. The interface unit 32 transmits the travel condition data to the unmanned vehicle 2 via the communication system 4. The control device 10 of the unmanned vehicle 2 acquires the travel condition data transmitted from the management device 3 via the communication system 4.

The control device 10 includes an interface unit 11, a data acquisition unit 12, a specified command value calculation unit 13A, a corrected command value calculation unit 13B, and a travel control unit 14.

The interface unit 11 is connected to each of the position sensor 41, the inclination sensor 42, the azimuth sensor 43, the speed sensor 44, the dump body sensor 45, the oil pressure sensor 46, the oil temperature sensor 47, the traveling device 23, and the wireless communication device 28. The interface unit 11 communicates with each of the position sensor 41, the inclination sensor 42, the azimuth sensor 43, the speed sensor 44, the dump body sensor 45, the oil pressure sensor 46, the oil temperature sensor 47, the traveling device 23, and the wireless communication device 28.

The data acquisition unit 12 acquires the travel condition data, which is transmitted from the management device 3 and defines the travel condition of the unmanned vehicle 2, via the interface unit 11. In addition, the data acquisition unit 12 acquires state data of the unmanned vehicle 2 before starting via the interface unit 11. The state data of the unmanned vehicle 2 refers to data indicating a state of the unmanned vehicle 2. The state data includes the detection data of the sensors mounted on the unmanned vehicle 2.

The specified command value calculation unit 13A calculates a specified command value S0 for starting the unmanned vehicle 2. The specified command value calculation unit 13A calculates the specified command value S0 based on the travel condition data acquired by the data acquisition unit 12. The specified command value S0 includes a specified accelerator command value. The accelerator command value refers to a command value for driving the drive device 23A. The specified command value calculation unit 13A calculates a position and a target travel speed Vr1 of the unmanned vehicle 2 after a lapse of a specified time (for example, one second) based on a target travel speed Vr0 at a travel point PI0 transmitted from the management device 3 and the current travel speed Vs and acceleration of the unmanned vehicle 2 detected by the speed sensor 44. When the current time is the starting time, the travel speed Vs of the unmanned vehicle 2 is zero. The specified command value calculation unit 13A calculates the specified command value S0, which is the specified accelerator command value, such that the travel speed Vs of the unmanned vehicle 2 after the lapse of the specified time becomes the target travel speed Vr1. Note that the current travel speed Vs of the unmanned vehicle 2 may be derived from the travel condition data without depending the detection data of the speed sensor 44.

The corrected command value calculation unit 13B determines whether request data requesting a limitation of the travel speed Vs of the unmanned vehicle 2 is acquired before starting the unmanned vehicle 2 based on at least one of the travel condition data and the state data acquired by the data acquisition unit 12. When determining that the request data is acquired, the corrected command value calculation unit 13B corrects the specified command value S0 to calculate a corrected command value Sa for starting the unmanned vehicle 2 based on the request data. The corrected command value Sa includes a corrected accelerator command value obtained by correcting the specified accelerator command value. The corrected command value Sa (corrected accelerator command value) is lower than the specified command value S0 (specified accelerator command value).

Figure 4:
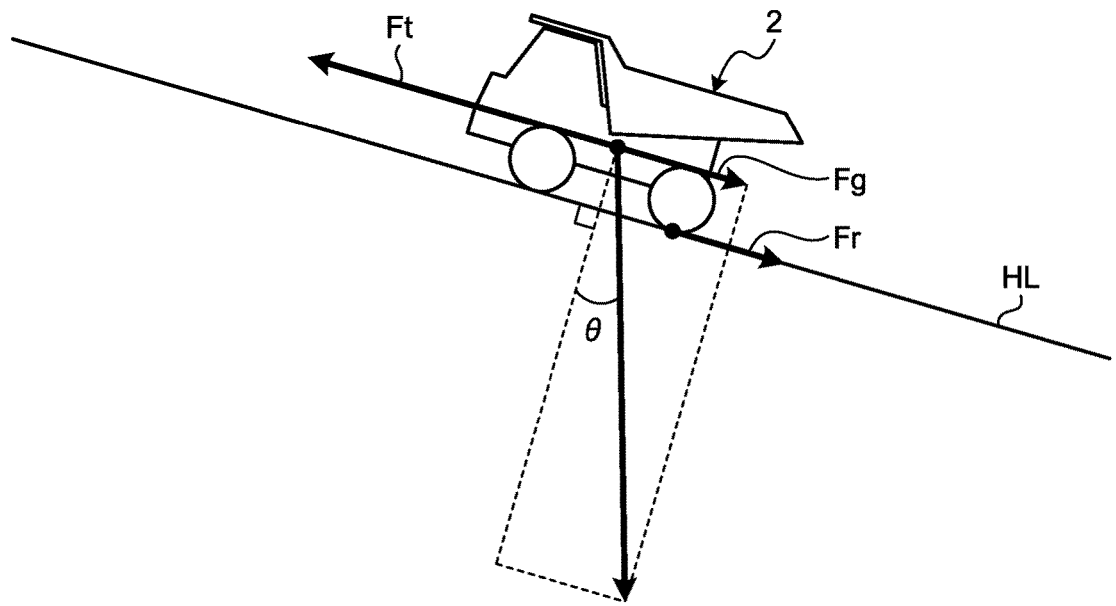
FIG. 4 is a schematic view for describing a method for calculating a command value according to the embodiment.

FIG. 4 is a schematic view for describing a method for calculating the accelerator command value S0 according to the present embodiment. When the weight of the unmanned vehicle 2 is Gv, the gravity acceleration is G, a target acceleration of the dump truck is at, a rolling resistance coefficient of a tire mounted on the wheel 27 of the unmanned vehicle 2 is Crr, and an inclination angle of the travel path HL with respect to the horizontal plane is θ, a target acceleration component Ft, a gravity component Fg, and a rolling resistance Fr of the unmanned vehicle 2 are expressed by the following Formulas (1), (2), and (3), respectively.

$$Ft = Gv \times at \qquad (1)$$

$$Fg = Gv \times G \times \sin\theta \qquad (2)$$

$$Fr = Gv \times G \times \cos\theta \times Crr \qquad (3)$$

A force Fd required for the unmanned vehicle 2 in a stopped state to start on the travel path HL is expressed by the following Formula (4).

$$Fd = Ft + Fg + Fr \qquad (4)$$

When a propulsive force for starting the unmanned vehicle 2 in the stopped state on the travel path HL is Fn and a gain is Ga, the accelerator command value S0 is expressed by the following Formula (5). Note that the propulsive force Fn is an eigenvalue that is defined in advance according to the specifications of the unmanned vehicle 2.

$$S0 = \frac{Fd}{Fn} \times Ga \qquad (5)$$

The specified command value calculation unit 13A calculates the accelerator command value S0 according to Formulas (1) to (5). For example, the accelerator command value S0 is a large value when an inclination angle θ of the travel path HL is large (when the travel path HL is an uphill path), and the accelerator command value S0 is a small value when the inclination angle θ of the travel path HL is small (when the travel path HL is a flat or downhill path). In addition, for example, the accelerator command value S0 is a large value when the weight Gv of the unmanned vehicle 2 is large, and the accelerator command value S0 is a small value when the weight Gv of the unmanned vehicle 2 is small.

The travel control unit 14 controls the traveling of the unmanned vehicle 2 based on the travel condition data. When the request data requesting the limitation of the travel speed Vs is not acquired, the travel control unit 14 controls the start of the unmanned vehicle 2 based on the specified command value S0 calculated by the specified command value calculation unit 13A. When the request data requesting the limitation of the travel speed Vs is acquired, the travel control unit 14 controls the start of the unmanned vehicle 2 based on the corrected command value Sa calculated by the corrected command value calculation unit 13B. The travel control unit 14 outputs the specified accelerator command value or the corrected accelerator command value to the drive device 23A of the traveling device 23. The drive device 23A generates power based on the specified accelerator command value or the corrected accelerator command value.

[Start Control]

Figure 5:
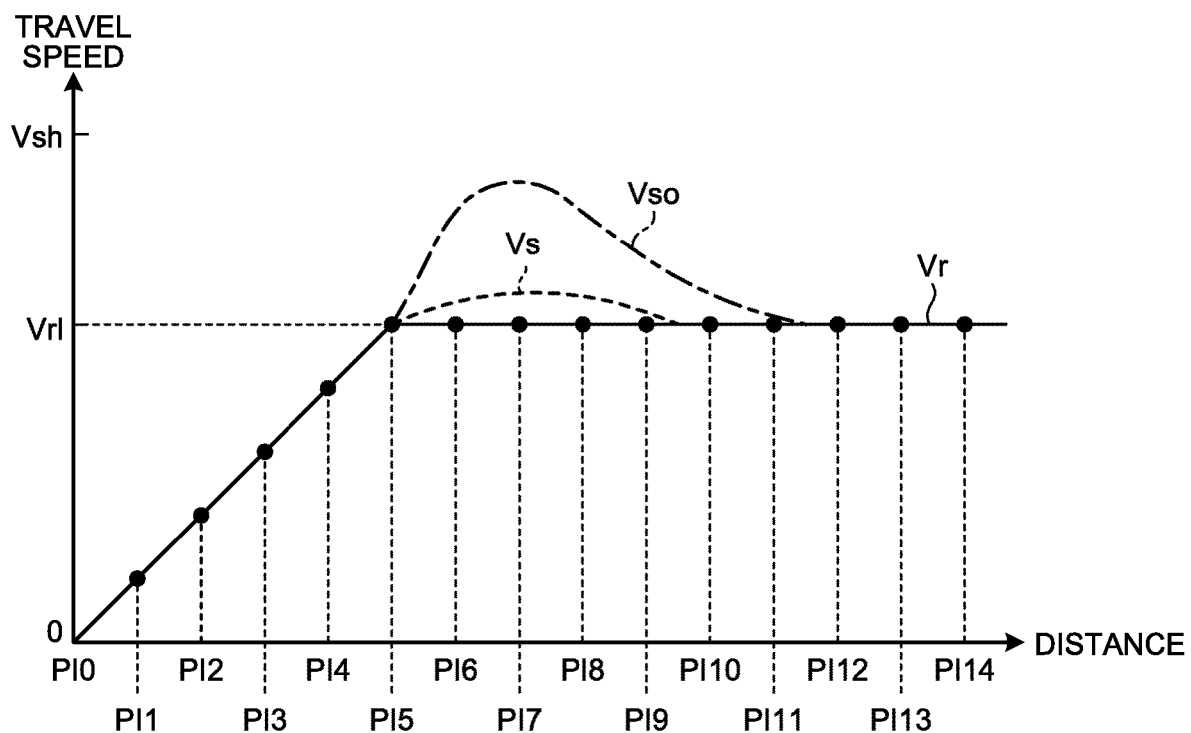
FIG. 5 is a schematic view for describing start control of the unmanned vehicle according to the embodiment.
Figure 6:
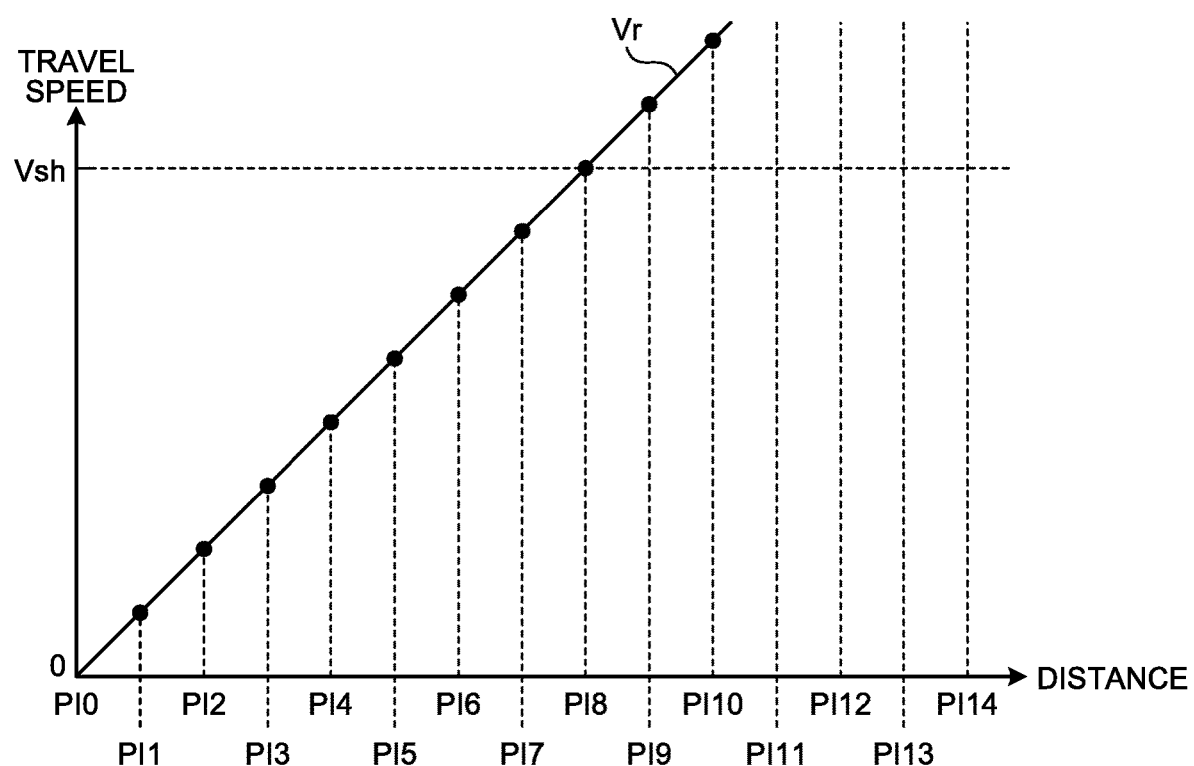
FIG. 6 is a schematic view for describing the start control of the unmanned vehicle according to the embodiment.

FIGS. 5 and 6 are schematic views for describing the start control of the unmanned vehicle 2 according to the present embodiment. In a graph illustrated in FIG. 5, the horizontal axis represents a distance ahead of the unmanned vehicle 2 in the stopped state, and the vertical axis represents a travel speed of the unmanned vehicle 2.

FIG. 5 illustrates an example of travel condition data that limits the travel speed Vs when starting the unmanned vehicle 2. FIG. 6 illustrates an example of travel condition data that does not limit the travel speed Vs when starting the unmanned vehicle 2. In each of FIGS. 5 and 6, the unmanned vehicle 2 is in the stopped state at the travel point PI0. The target travel speed Vr is set for each of the plurality of travel points PI (PI0, PI1, PI2, and so on).

In the example illustrated in FIG. 5, the travel condition data is set such that the unmanned vehicle 2 accelerates between the travel point PI0 and the travel point PI5. At the travel points PI6, PI7, and so on, ahead of the travel point PI5, the travel condition data is set such that the unmanned vehicle 2 travels at a travel speed Vr1 lower than a speed threshold Vsh.

That is, in the example illustrated in FIG. 5, when the unmanned vehicle 2 starts, the travel speed Vs of the unmanned vehicle 2 is limited to the travel speed Vr1 that is lower than the speed threshold Vsh. In the following description, the travel speed Vr1 is appropriately referred to as the limit value Vr1 of the travel speed Vs.

In the example illustrated in FIG. 6, the travel condition data is set such that the unmanned vehicle 2 accelerates between the travel point PI0 and the travel point PI5. In addition, the travel condition data is set such that the unmanned vehicle 2 also accelerates at the travel points PI6, PI7, and so on, ahead of the travel point PI5 in the example illustrated in FIG. 6. The travel condition data is set such that the unmanned vehicle 2 travels at the travel speed Vs higher than the speed threshold Vsh.

That is, in the example illustrated in FIG. 6, when the unmanned vehicle 2 starts, the travel speed Vs of the unmanned vehicle 2 is not limited, and the travel condition data is set so as to accelerate up to the travel speed Vs higher than the speed threshold Vsh.

The request data for requesting the limitation of the travel speed Vs of the unmanned vehicle 2 when starting the unmanned vehicle 2 includes the limit value Vr1 of the travel speed Vs. The corrected command value calculation unit 13B determines whether the limitation of the travel speed of the unmanned vehicle 2 when starting the unmanned vehicle 2 is requested based on the travel condition data. The corrected command value calculation unit 13B determines whether the limitation of the travel speed Vs is requested based on the target travel speed Vr set at the travel point ahead by a specified distance from the unmanned vehicle 2 in the stopped state, and calculates the corrected command value Sa when determining that the limitation of the travel speed Vs is requested.

As an example, the corrected command value calculation unit 13B determines whether the limitation of the travel speed Vs is requested based on the target travel speed Vr set at the travel point PI10 ahead by 10 points from the unmanned vehicle 2 in the stopped state at the travel point PI0. For example, the corrected command value calculation unit 13B determines that the limitation of the travel speed Vs is requested when the target travel speed Vr set at the travel point PI10 is lower than the speed threshold Vsh. The corrected command value calculation unit 13B determines that the limitation of the travel speed Vs is not requested when the target travel speed Vr set at the travel point PI10 is equal to or higher than the speed threshold Vsh. That is, when the travel condition data illustrated in FIG. 5 is set, the corrected command value calculation unit 13B determines that the limitation of the travel speed Vs is requested. When the travel condition data illustrated in FIG. 6 is set, the corrected command value calculation unit 13B determines that the limitation of the travel speed Vs is not requested. In this manner, the corrected command value calculation unit 13B compares the target travel speed Vr and the speed threshold Vsh specified by the travel condition data, and determines that the limitation of the travel speed Vs is requested when determining that the target travel speed Vr is set to the limit value Vr1 lower than the speed threshold Vsh, and determines that the limitation of the travel speed Vs is not requested when determining that the target travel speed Vr is not set to the limit value Vr1 lower than the speed threshold Vsh.

When the limitation of the travel speed Vs is requested, the corrected command value calculation unit 13B adjusts the gain Ga illustrated in Formula (5) based on the limit value Vr1 to calculate the corrected command value Sa. That is, the corrected command value calculation unit 13B reduces the corrected command value Sa (reduces the gain Ga) as the limit value Vr1 of the travel speed Vs specified by the travel condition data is lower. The corrected command value calculation unit 13B increases the corrected command value Sa (increases the gain Ga) as the limit value Vr1 specified by the travel condition data is higher.

Note that the corrected command value Sa (corrected accelerator command value) is not necessarily proportional to the limit value Vr1, and may be a set value preset by a preliminary test based on the limit value Vr1.

In the example illustrated in FIG. 5, when the travel control unit 14 controls the start of the unmanned vehicle 2 based on the specified command value S0, the actual travel speed Vs of the unmanned vehicle 2 is likely to overshoot the target travel speed Vr as indicated by the line Vso although the limit value Vr1 is set to the target travel speed Vr immediately after the start of the unmanned vehicle 2. As a result, the unmanned vehicle 2 is likely to deviate from the target travel course CS. If the unmanned vehicle 2 deviates from the target travel course CS and the operation of the unmanned vehicle 2 is stopped, the productivity at the work site is likely to decrease.

In the present embodiment, when the limit value Vr1 is set to the target travel speed Vr immediately after the start of the unmanned vehicle 2, that is, when the limitation of the travel speed Vs is requested, the corrected command value calculation unit 13B calculates the corrected command value Sa at the time of starting the unmanned vehicle 2 based on the limit value Vr1, and outputs the calculated corrected command value Sa to the travel control unit 14. The travel control unit 14 controls the drive device 23A based on the corrected command value Sa. Accordingly, the travel speed Vs of the unmanned vehicle 2 can follow the target travel speed Vr without overshooting the target travel speed Vr as indicated by the line Vs in FIG. 5. In addition, the unnecessary acceleration of the unmanned vehicle 2 is suppressed, and thus, deterioration of a fuel consumption rate of the unmanned vehicle 2 can be suppressed.

On the other hand, when the limit value Vr1 is not set to the target travel speed Vr immediately after the start of the unmanned vehicle 2 as in the example illustrated in FIG. 6, that is, when the limitation of the travel speed Vs is not requested, the specified command value calculation unit 13A calculates the specified command value S0 based on the travel condition data, and outputs the calculated specified command value S0 to the travel control unit 14. The travel control unit 14 drives the drive device 23A based on the specified command value S0. As a result, the unmanned vehicle 2 can be accelerated with a high acceleration at the time of starting. Therefore, the decrease in productivity at the work site is suppressed.

The example in which the corrected command value calculation unit 13B determines whether the limitation of the travel speed Vs is requested based on the travel condition data has been described as above. The corrected command value calculation unit 13B may determine whether the limitation of the travel speed Vs is requested based on the state data of the unmanned vehicle 2 before starting. As described above, the state data of the unmanned vehicle 2 refers to data indicating a state of the unmanned vehicle 2. The state data includes the detection data of the sensors mounted on the unmanned vehicle 2. The corrected command value calculation unit 13B calculates the corrected command value Sa lower than the specified command value S0 when determining that it is necessary to cause the unmanned vehicle 2 to travel slowly when starting the unmanned vehicle 2 based on the state data of the unmanned vehicle 2.

Hereinafter, an example in which whether the limitation of the travel speed Vs is requested is determined based on the state data of the unmanned vehicle 2 before starting will be described.

For example, when discharging the cargo loaded in the dump body 22 from the dump body 22, the hoist cylinder operates such that the dump body 22 changes from the loading posture to the dumping posture in the stopped state of the unmanned vehicle 2. After the dump body 22 is set in the dumping posture, the unmanned vehicle 2 starts traveling such that the entire cargo is discharged from the dump body 22. When the unmanned vehicle 2 in the stopped state starts with the dump body 22 in the dumping posture, the limitation of the travel speed Vs of the unmanned vehicle 2 is requested. The position of the dump body 22 is detected by the dump body sensor 45. The data acquisition unit 12 acquires the detection data of the dump body sensor 45 via the interface unit 11. The corrected command value calculation unit 13B can determine whether the dump body 22 is in the dumping posture based on the detection data of the dump body sensor 45. The request data includes the detection data of the dump body sensor 45. The corrected command value calculation unit 13B determines whether the limitation of the travel speed Vs of the unmanned vehicle 2 is requested based on the detection data of the dump body sensor 45 before the unmanned vehicle 2 starts. When the unmanned vehicle 2 in the stopped state starts with the dump body 22 in the dumping posture, the corrected command value calculation unit 13B calculates the corrected command value Sa such that the travel speed Vs of the unmanned vehicle 2 is limited. The travel control unit 14 controls the start of the unmanned vehicle 2 based on the corrected command value Sa calculated by the corrected command value calculation unit 13B.

In addition, for example, when the temperature of the hydraulic oil is low and the target travel course CS includes a steep curve in the case where the unmanned vehicle 2 in the stopped state starts, the responsiveness of the steering cylinder deteriorates due to the low temperature of the hydraulic oil, and thus, the limitation of the travel speed Vs of the unmanned vehicle 2 is requested. The temperature of the hydraulic oil is detected by the oil temperature sensor 47. The data acquisition unit 12 acquires the detection data of the oil temperature sensor 47 via the interface unit 11. The corrected command value calculation unit 13B can determine whether the temperature of the hydraulic oil is lower than a temperature threshold based on the detection data of the oil temperature sensor 47. The request data includes the detection data of the oil temperature sensor 47. The corrected command value calculation unit 13B determines whether the limitation of the travel speed Vs of the unmanned vehicle 2 is requested based on the detection data of the oil temperature sensor 47 before the unmanned vehicle 2 starts. When the unmanned vehicle 2 in the stopped state starts in the state where the temperature of the hydraulic oil is lower than the temperature threshold, the corrected command value calculation unit 13B calculates the corrected command value Sa such that the travel speed Vs of the unmanned vehicle 2 is limited. The travel control unit 14 controls the start of the unmanned vehicle 2 based on the corrected command value Sa calculated by the corrected command value calculation unit 13B.

In addition, the limitation of the travel speed Vs of the unmanned vehicle 2 is requested, for example, in a case where the pressure of the hydraulic oil is low when the unmanned vehicle 2 in the stopped state starts. The hydraulic oil pressure is detected by the oil pressure sensor 46. The data acquisition unit 12 acquires the detection data of the oil pressure sensor 46 via the interface unit 11. The corrected command value calculation unit 13B can determine whether the pressure of the hydraulic oil is lower than a pressure threshold based on the detection data of the oil pressure sensor 46. The request data includes the detection data of the oil pressure sensor 46. The corrected command value calculation unit 13B determines whether the limitation of the travel speed Vs of the unmanned vehicle 2 is requested based on the detection data of the oil pressure sensor 46 before the unmanned vehicle 2 starts. When the unmanned vehicle 2 in the stopped state starts in the state where the hydraulic oil pressure is lower than the pressure threshold, the corrected command value calculation unit 13B calculates the corrected command value Sa such that the travel speed Vs of the unmanned vehicle 2 is limited. The travel control unit 14 controls the start of the unmanned vehicle 2 based on the corrected command value Sa calculated by the corrected command value calculation unit 13B.

In addition, not only the unmanned vehicle 2 but also a manned vehicle travels at the work site of the mine. The manned vehicle travels at the work site to manage or monitor the work site. For example, in a case where the manned vehicle is present near the unmanned vehicle 2 when the unmanned vehicle 2 in the stopped state starts, the limitation of the travel speed Vs of the unmanned vehicle 2 is requested. The position data of the unmanned vehicle 2 and position data of the manned vehicle are transmitted to the management device 3. Therefore, the management device 3 can determine whether the manned vehicle is present near the unmanned vehicle 2. In addition, even when another unmanned vehicle 2 is present near the unmanned vehicle 2, the limitation of the travel speed Vs of the unmanned vehicle 2 is requested. When it is determined that the manned vehicle or the other unmanned vehicle 2 is present near the unmanned vehicle 2, the management device 3 generates travel condition data such that the travel speed Vs of the unmanned vehicle 2 is limited at the time of starting, and transmits the travel condition data to the unmanned vehicle 2. The travel condition data includes the limit value Vr1 as described with reference to FIG. 5. The request data includes the limit value Vr1. The data acquisition unit 12 acquires the travel condition data via the interface unit 11. The corrected command value calculation unit 13B calculates the corrected command value Sa such that the travel speed Vs of the unmanned vehicle 2 is limited before the unmanned vehicle 2 starts. The travel control unit 14 controls the start of the unmanned vehicle 2 based on the corrected command value Sa calculated by the corrected command value calculation unit 13B.

In addition, the limitation of the travel speed Vs of the unmanned vehicle 2 is requested, for example, in a case where a position of the target travel course CS and an actual position of the unmanned vehicle 2 are displaced or the target azimuth θr set at the travel point PI and an actual azimuth of the unmanned vehicle 2 are displaced when the unmanned vehicle 2 in the stopped state starts. That is, when the unmanned vehicle 2 in the stopped state is suddenly accelerated or travels at a high speed in a state where the displacement amount of the position or azimuth is large, the displacement amount is likely to be further increased. Therefore, in the case where the displacement amount of the position or azimuth is large when the unmanned vehicle 2 in the stopped state starts, the limitation of the travel speed Vs of the unmanned vehicle 2 is suppressed. The position sensor 41 and the azimuth sensor 43 detect the position and azimuth of the unmanned vehicle 2. The data acquisition unit 12 acquires the detection data of the position sensor 41 and the detection data of the azimuth sensor 43 via the interface unit 11. The corrected command value calculation unit 13B can determine whether the displacement amount between the position of the target travel course CS and the actual position of the unmanned vehicle 2 or the displacement amount between the target azimuth θr and the actual azimuth of the unmanned vehicle 2 is larger than a displacement amount threshold based on the detection data of the position sensor 41 and the detection data of the azimuth sensor 43. The request data includes the detection data of the position sensor 41 and the detection data of the azimuth sensor 43. The corrected command value calculation unit 13B determines whether the limitation of the travel speed Vs of the unmanned vehicle 2 is requested based on the detection data of the position sensor 41 and the detection data of the azimuth sensor 43 before the unmanned vehicle 2 starts. When the unmanned vehicle 2 in the stopped state starts in the state where the displacement amount is larger than the displacement amount threshold, the corrected command value calculation unit 13B calculates the corrected command value Sa such that the travel speed Vs of the unmanned vehicle 2 is limited. The travel control unit 14 controls the start of the unmanned vehicle 2 based on the corrected command value Sa calculated by the corrected command value calculation unit 13B.

In addition, there is a case where test traveling of the unmanned vehicle 2 is performed before the unmanned vehicle 2 starts to operate at the work site based on the travel condition data, for example. In the test traveling, the limitation of the travel speed Vs of the unmanned vehicle 2 is requested. The request data includes test traveling data indicating that the unmanned vehicle 2 is performing the test traveling. The corrected command value calculation unit 13B calculates the corrected command value Sa such that the travel speed Vs of the unmanned vehicle 2 is limited during the test traveling. The travel control unit 14 controls the start of the unmanned vehicle 2 based on the corrected command value Sa calculated by the corrected command value calculation unit 13B.

In addition, the limitation of the travel speed Vs of the unmanned vehicle 2 is requested, for example, when an abnormality of the unmanned vehicle 2 is detected before starting. The request data includes abnormality data indicating the abnormality of the unmanned vehicle 2. When the abnormality of the unmanned vehicle 2 is detected before starting, the corrected command value calculation unit 13B calculates the corrected command value Sa such that the travel speed Vs of the unmanned vehicle 2 is limited. The travel control unit 14 controls the start of the unmanned vehicle 2 based on the corrected command value Sa calculated by the corrected command value calculation unit 13B.

[Control Method]

Figure 7:
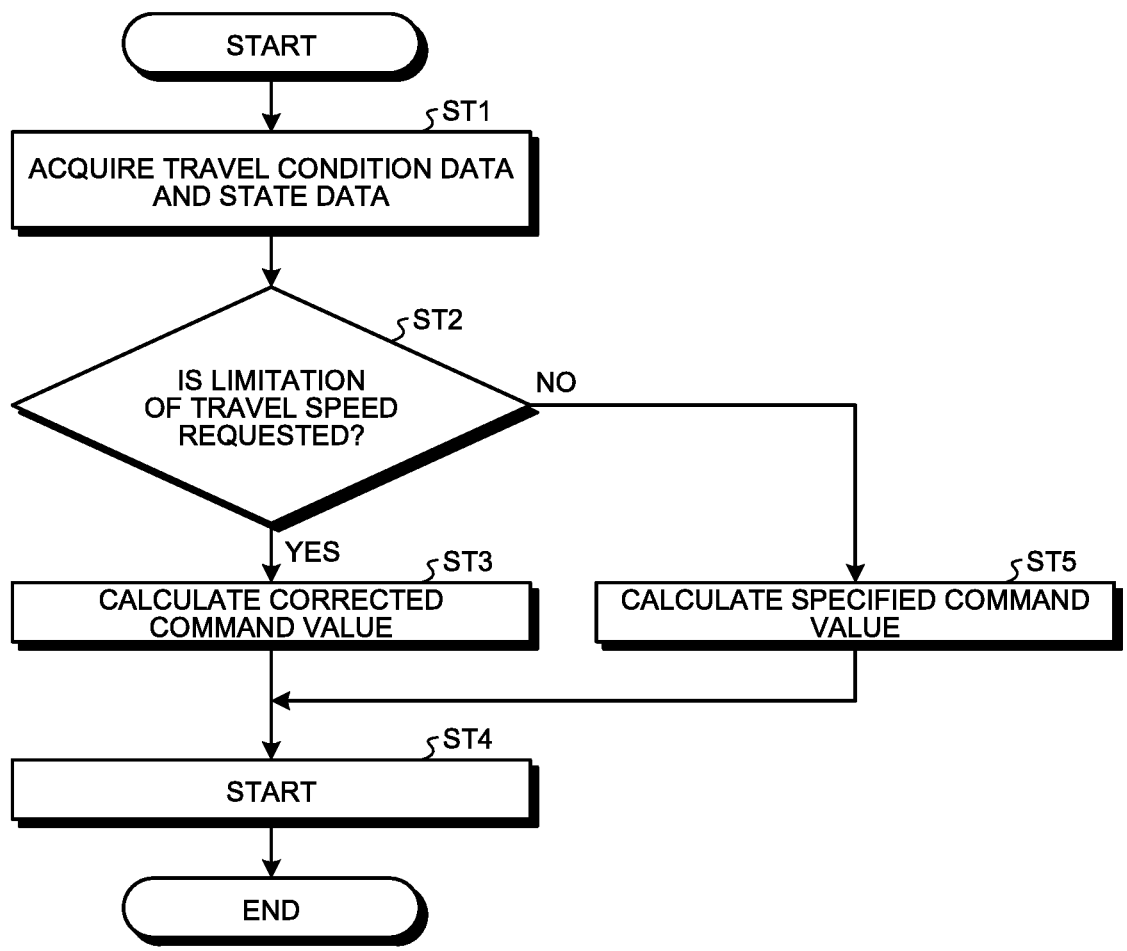
FIG. 7 is a flowchart illustrating an unmanned vehicle control method according to the embodiment.

FIG. 7 is a flowchart illustrating a method for controlling the unmanned vehicle 2 according to this embodiment. Before the unmanned vehicle 2 in the stopped state starts, the data acquisition unit 12 acquires the travel condition data and the state data of the unmanned vehicle 2 via the interface unit 11 (Step ST1).

The corrected command value calculation unit 13B determines whether the limitation of the travel speed Vs is requested based on the travel condition data and the state data acquired by the data acquisition unit 12 (Step ST2).

When determining that the limitation of the travel speed Vs is requested in Step ST2 (Step ST2: Yes), the corrected command value calculation unit 13B calculates the corrected command value Sa such that the travel speed Vs of the unmanned vehicle 2 immediately after starting is limited (Step ST3).

For example, as described with reference to FIG. 5, when the travel condition data includes the limit value Vr1, the corrected command value calculation unit 13B calculates the corrected command value Sa lower than the maximum value based on the travel condition data such that the travel speed Vs does not exceed the limit value Vr1.

In addition, as described above, the corrected command value calculation unit 13B calculates the corrected command value Sa lower than the specified command value S0 based on the state data such that the travel speed Vs is limited, for example, when determining that the dump body 22 is in the dumping posture based on the detection data of the dump body sensor 45, when determining that the temperature of the hydraulic oil is lower than the temperature threshold based on the detection data of the oil temperature sensor 47, when determining that the pressure of the hydraulic oil is lower than the pressure threshold based on the detection data of the oil pressure sensor 46, when determining that the manned vehicle or the other unmanned vehicle 2 is present near the unmanned vehicle 2, when determining that the position of the target travel course CS and the actual position of the unmanned vehicle 2 are displaced, when determining that the target azimuth θr and the actual azimuth of the unmanned vehicle 2 are displaced, when determining that the unmanned vehicle 2 is performing the test traveling, or when determining that the abnormality has occurred in the unmanned vehicle 2.

The travel control unit 14 controls the start of the unmanned vehicle 2 based on the corrected command value Sa calculated in Step ST3. The drive device 23A operates based on the corrected command value Sa that has been limited. The unmanned vehicle 2 starts slowly (Step ST4).

When determining that the limitation of the travel speed Vs is not requested in Step ST2 (Step ST2: No), the specified command value calculation unit 13A outputs the specified command value S0 calculated based on the travel condition data to the travel control unit 14 (Step ST5).

The travel control unit 14 controls the start of the unmanned vehicle 2 based on the specified command value S0 output in Step ST5. The drive device 23A operates based on the specified command value S0. The unmanned vehicle 2 starts with a high acceleration (Step ST4).

[Computer System]

Figure 8:
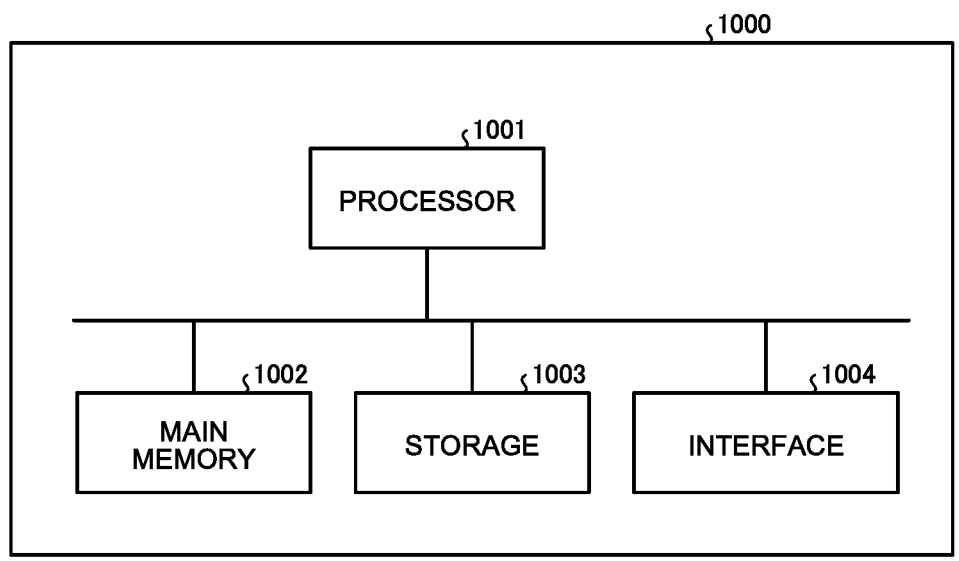
FIG. 8 is a block diagram illustrating an example of a computer system according to the embodiment.

FIG. 8 is a block diagram illustrating an example of a computer system 1000. Each of the management device 3 and the control device 10 described above includes the computer system 1000. The computer system 1000 includes: a processor 1001 such as a central processing unit (CPU); a main memory 1002 including a nonvolatile memory such as a read only memory (ROM) and a volatile memory such as a random access memory (RAM); a storage 1003; and an interface 1004 including an input/output circuit. The functions of the management device 3 and the functions of the control device 10 described above are stored in the storage 1003 as programs. The processor 1001 reads the program from the storage 1003, expands the read program in the main memory 1002, and executes the above-described processing according to the program. Note that the program may be delivered to the computer system 1000 via a network.

[Effect]

As described above, according to this embodiment, when the request data requesting the limitation of the travel speed Vs of the unmanned vehicle 2 is acquired before the unmanned vehicle 2 starts, the corrected command value calculation unit 13B calculates the corrected command value Sa for starting the unmanned vehicle 2 such that the travel speed Vs is limited at the time of starting the unmanned vehicle 2. The travel control unit 14 controls the start of the unmanned vehicle 2 based on the calculated corrected command value Sa. This prevents the actual travel speed Vs of the unmanned vehicle 2 from overshooting the target travel speed Vr after the start of the unmanned vehicle 2. Therefore, it is possible to prevent the unmanned vehicle 2 from deviating from the target travel course CS. Therefore, a decrease in productivity at the work site is suppressed. In addition, when the limitation of the travel speed Vs is requested, the unnecessary acceleration of the unmanned vehicle 2 is suppressed, and thus, the deterioration of the fuel consumption rate of the unmanned vehicle 2 can be suppressed.

In addition, when the limitation of the travel speed Vs is not requested, the specified command value calculation unit 13A outputs the specified command value S0 calculated based on the travel condition data to the travel control unit 14. The travel control unit 14 drives the drive device 23A based on the specified command value S0. As a result, the unmanned vehicle 2 can be accelerated with a high acceleration at the time of starting. Therefore, the decrease in productivity at the work site is suppressed.

OTHER EMBODIMENTS

Note that the command values (the specified command value S0 and the corrected command value Sa) are the accelerator command values for driving the drive device 23A in the above embodiment. The command value may be the target travel speed Vr0 at the travel point PI, or the target travel speed Vr1 after the lapse of the specified time from the current time.

Note that at least some of the functions of the control device 10 may be provided in the management device 3, and at least some of the functions of the management device 3 may be provided in the control device 10, in the above embodiment. For example, the management device 3 may have the function of the corrected command value calculation unit 13B such that the corrected command value Sa calculated by the management device 3 is transmitted to the control device 10 of the unmanned vehicle 2 via the communication system 4, in the above embodiment. The travel control unit 14 of the control device 10 controls the start of the unmanned vehicle 2 based on the corrected command value Sa transmitted from the management device 3.

REFERENCE SIGNS LIST

1 MANAGEMENT SYSTEM
2 UNMANNED VEHICLE
3 MANAGEMENT DEVICE
4 COMMUNICATION SYSTEM
5 CONTROL FACILITY
6 WIRELESS COMMUNICATION DEVICE
7 LOADER
8 CRUSHER
10 CONTROL DEVICE
11 INTERFACE UNIT
12 DATA ACQUISITION UNIT
13A SPECIFIED COMMAND VALUE CALCULATION UNIT
13B CORRECTED COMMAND VALUE CALCULATION UNIT
14 TRAVEL CONTROL UNIT
21 VEHICLE MAIN BODY
22 DUMP BODY
23 TRAVELING DEVICE
23A DRIVE DEVICE
23B BRAKE DEVICE
23C STEERING DEVICE
27 WHEEL
27F FRONT WHEEL
27R REAR WHEEL
28 WIRELESS COMMUNICATION DEVICE
31 TRAVEL CONDITION DATA GENERATION UNIT
32 INTERFACE UNIT
33 INPUT DEVICE
34 OUTPUT DEVICE
41 POSITION SENSOR
42 INCLINATION SENSOR
43 AZIMUTH SENSOR
44 SPEED SENSOR
45 DUMP BODY SENSOR
46 OIL PRESSURE SENSOR
47 OIL TEMPERATURE SENSOR
CS TARGET TRAVEL COURSE
HL TRAVEL PATH
IS INTERSECTION
PA WORK SITE
PA1 LOADING SITE
PA2 DISCHARGING SITE
PI TRAVEL POINT

The invention claimed is:

1. An unmanned vehicle control system comprising:
a specified command value calculation unit that calculates a specified accelerator command value for start of an unmanned vehicle in a stopped state;
a corrected command value calculation unit that determines whether a target travel speed set at a travel point ahead by a specified distance including a plurality of the travel points is lower than a speed threshold set in advance and, when the target travel speed is determined to be lower than the speed threshold, determines that a limitation of a travel speed of the unmanned vehicle is requested to correct the specified accelerator command value and calculate a corrected accelerator command value for start of the unmanned vehicle in the stopped state, the corrected accelerator command value being lower than the specified accelerator command value; and
a travel control unit that, when it is determined that the limitation of the travel speed of the unmanned vehicle is requested, controls the start of the unmanned vehicle based on the corrected accelerator command value.

2. The unmanned vehicle control system according to claim 1, further comprising:
a data acquisition unit that acquires state data of the unmanned vehicle before starting, wherein
the corrected command value calculation unit determines whether the limitation of the travel speed is requested based on the state data, and calculates the corrected accelerator command value for start of the unmanned vehicle in the stopped state.

3. An unmanned vehicle comprising the unmanned vehicle control system according to claim 1.

4. An unmanned vehicle control method comprising:
calculating a specified accelerator command value for start of an unmanned vehicle in a stopped state;
correcting a determination whether a target travel speed set at a travel point ahead by a specified distance including a plurality of the travel points is lower than a speed threshold set in advance and, when the target travel speed is determined to be lower than the speed threshold, determining that a limitation of a travel speed of the unmanned vehicle is requested to correct the specified accelerator command value and calculate a corrected accelerator command value for start of the unmanned vehicle in the stopped state, the corrected accelerator command value being lower than the specified accelerator command value; and controlling, when it is determined that the limitation of the travel speed of the unmanned vehicle is requested, the start of the unmanned vehicle based on the corrected accelerator command value.

\* \* \* \* \*